Figure 1:
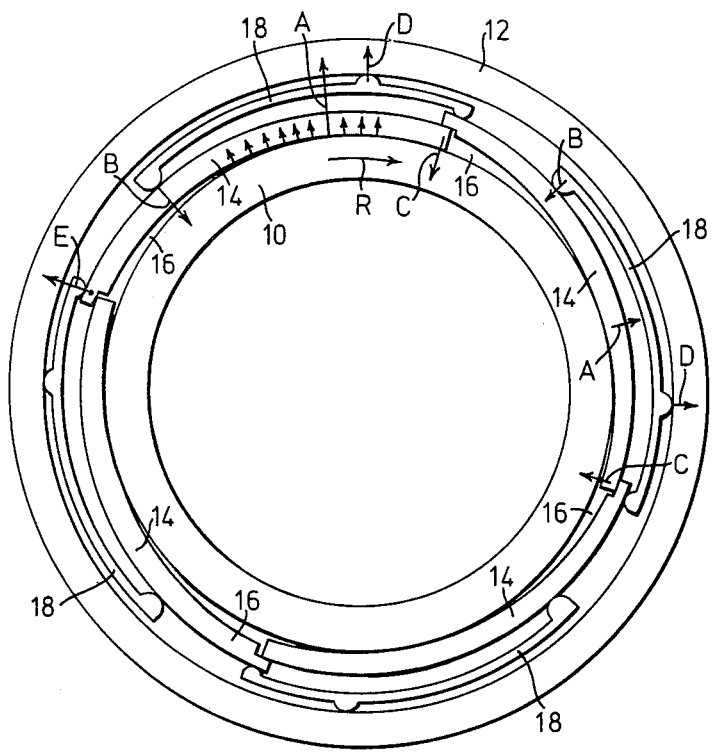

United States Patent [19]

Newman et al.

[11] 4,118,079
[45] Oct. 3, 1978

[54] FLUID BEARINGS WITH CONFORMING SHELLS

[75] Inventors: Paul Newman; Raymond Fredrick Sargent, both of Bristol, England

[73] Assignee: Rolls-Royce Limited, Great Britain

[21] Appl. No.: 801,791

[22] Filed: May 31, 1977

[30] Foreign Application Priority Data

Jun. 12, 1976 [GB] United Kingdom ............... 24451/76

[51] Int. Cl.$^2$ ............................................. F16C 35/00
[52] U.S. Cl. ......................................... 308/9; 308/73; 308/121; 308/DIG. 1
[58] Field of Search ................. 308/9, 26, 72, 73, 121, 308/122, DIG. 1, DIG. 15, 160, 170; 277/DIG. 5

[56] References Cited

U.S. PATENT DOCUMENTS

| 3,215,480 | 11/1965 | Marley | 308/121 |
|---|---|---|---|
| 3,635,534 | 1/1972 | Barnett | 308/121 |
| 3,951,475 | 4/1976 | Okano et al. | 308/9 |

Primary Examiner—Trygve M. Blix
Assistant Examiner—Douglas C. Butler
Attorney, Agent, or Firm—Stevens, Davis, Miller & Mosher

[57] ABSTRACT

A fluid bearing assembly includes a shaft mounted for rotation in a housing on a fluid film in a gap formed between the shaft surface and confronting surfaces on a plurality of shells mounted in the housing. The shells are relatively thick so that they bend in the manner of a stiff beam, and resilient supports are disposed between the shells and the housing which transmit fluid pressure forces on the shells to the housing and at the same time provide reaction loads on the shells which operate in pre-determined manner in opposition to changes in the fluid pressure forces to bend the shells to increase the load carrying capacity of the bearing.

15 Claims, 8 Drawing Figures

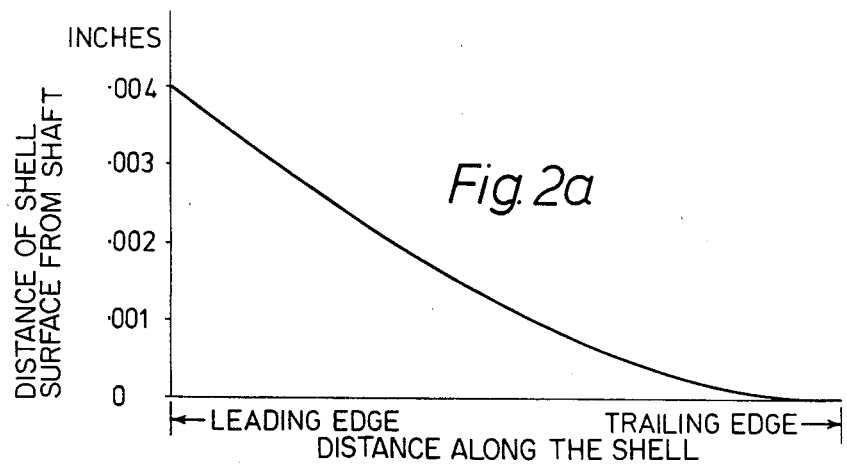
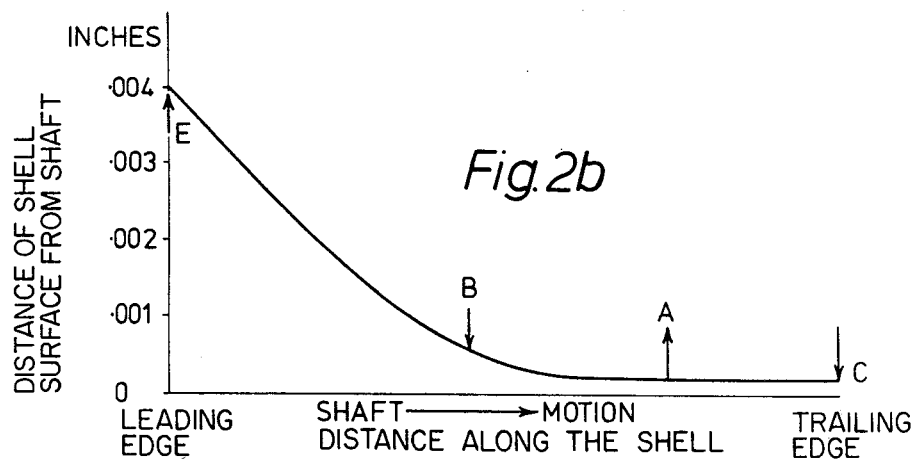
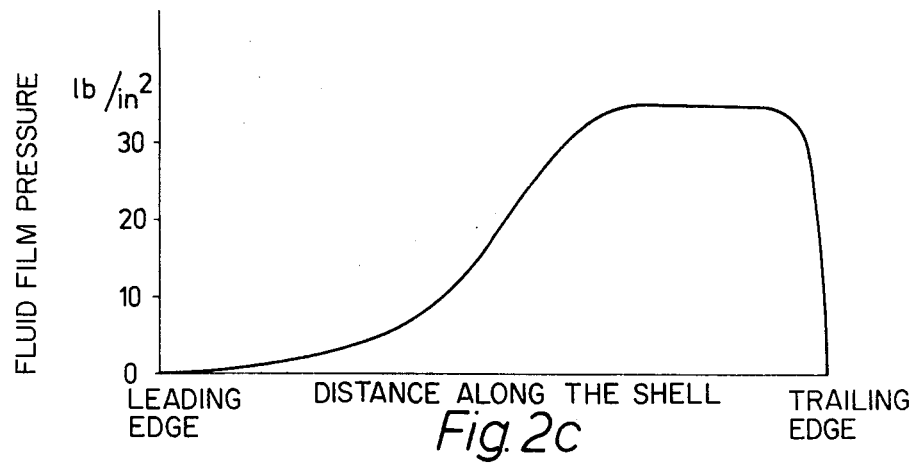

FLUID BEARINGS WITH CONFORMING SHELLS

The present invention relates to fluid bearings. Apart from plain bearings, modern fluid bearings fall into two main categories known as foil bearings and tilting pad bearings respectively.

In a foil bearing a rotatable shaft is supported in a stationary housing by means of a plurality of resilient thin foils which are stationary within the housing. Rotation of the shaft causes a build up of air pressure in the wedge-shaped spaces between the foil and shaft surfaces, which ultimately lifts the foils from the shaft surface, allowing the shaft to run on cushions of air within the foils. Because the foils are thin and resilient, they accommodate radial excursions and growth of the shaft. Foil bearings have been proposed also for use in thrust bearing and linear bearing applications.

Foil bearings are described in the specifications of various United States patents granted to the Garrett Corporation, and in particular in U.S. Pat. Nos. 3,215,480; 3,434,762 and 3,635,534. In these specifications a foil is defined as a thin flexible film lubricated bearing element, or strip, whose thickness relative to its other dimensions is such that it will be locally deflected by the hydro-dynamic film forces between the shaft and foil. This definition is made to differentiate foil bearings from the resiliently supported shoe bearings also known as pad bearings, in which the shoe or pad is rigid so as to preserve its own geometry and relies on a resilient mounting for accommodating shaft movements. The foils, as described in U.S. Pat. No. 3,434,762 may be as thin as 0.001 ins. or as described in U.S. Pat. No. 3,215,480, may have a thickness which is 0.006 ins per inch of journal diameter.

We have found the thinness of the foils puts a limitation on the performance of this type of bearings. The maximum pressure in the fluid film supporting the bearing is built up in the region of minimum gap thickness.

As soon as pressure begins to build up between the shaft and the foil, the foil is deflected away from the shaft except in the immediate vicinity of the supports. The load carrying capacity of the bearing is a function of the product of the pressures generated and the area over which these pressures act. Since the pressures can only act in the immediate vicinity of the supports, they act only on a small proportion of the area of the bearing foils. High pressures are therefore demanded to support the relatively high working load in a heavy duty bearing, such as for example in a gas turbine engine, and this necessitates very small clearances which limit the bearing capacity due to premature contact with the shaft or excess heat generation.

The problem is, therefore, how to prevent such deflections reducing the capacity of the bearing while at the same time providing sufficient resilience in the bearing to accommodate orbital excursions of the shaft and differential thermal expansions of the various components.

This problem is solved in the present invention by replacing the thin foils, or rigid pads respectively, of the known bearings with relatively thick but still resilient shells, and introducing controlled bending of the shells under operating conditions of the bearing to optimise the load carrying capacity of the bearing.

Throughout this specification the term "resilient shell" is to be taken to mean a plate, pad or the like, which may be curved or flat and the thickness of which, relative to its other dimensions is such that it can deflect, or bend, in the general manner of a stiff beam under the influence of the gas pressure loads and the concentrated support or reaction loads, but is stiff enough to resist local deflections due to the high fluid pressure loads produced in operation under its unsupported length between load reaction points, so as to be capable of maintaining a substantially uniform fluid film thickness throughout the unsupported length between load reaction points.

In this respect it acts in a completely different way to the foil gas bearing. Comparison between such a foil and a shell that the shell may be of the order of 10 times the thickness of a foil for a comparable heavy duty bearing application and is thus of the order of 1,000 times the stiffness.

An additional benefit of the shell bearing is that the shells, being relatively thick can be coated with high temperature anti-friction coatings, such as cobalt or chromium oxides, by plasma spraying, which was not possible with the thin foils.

According to the present invention there is provided a fluid bearing assembly including a pair of elements mounted for relative movement with respect to each other, one of the elements constituting a supporting element and being adapted to support the other element on a fluid film formed between the elements during said relative movement, and wherein one of the elements comprises:

a substantially rigid backing member, a plurality of resilient shells (as hereinbefore defined) mounted on the backing member, each sheel having a surface which extends in the direction of said relative movement, which is arranged to confront a surface on the other element and which defines therewith a gap which tapers in the direction of the trailing edge of the shell, and, at least two supports, also termed load reacting members, for each shell disposed at locations spaced apart along the shell in the direction of said relative movement and co-acting between the shells and the backing member to transmit gas pressure loads on the shells to the backing member, said supports being capable of moving with the shell towards or away from the backing member under the influence of changes of pressure in the fluid film to provide reaction loads of pre-determined relative magnitudes on the shells, which loads in combination with the gas pressure loads bend the shells to change the gap profile.

Also according to the invention there is provided a bearing element for a fluid bearing assembly as hereinbefore described.

The bending is preferably effected by positioning the supports between the shells and the housing in such a manner that a pre-selected portion of the fluid pressure load is reacted adjacent the trailing edge of each shell, and the remainder of the radial load is reacted at an intermediate position between the ends of each shell. These reactions between the shells and the supports in conjunction with the fluid pressure load cause a bending deformation to be imparted to the shells which modifies the shape of the shells so that they conform more closely with the shape of the surface of the supported element in the region of the minimum gap thickness and create a more uniform gap thickness over a greater length of the shell.

The shell bearings as described above according to the invention may be used as shaft bearings, both for radial and thrust loads on the shafts, or may be used in a linear bearing application.

The fluid film which is provided in the bearing may be a liquid or gas film. Conveniently however, for most applications the fluid film will be an air film generated during relative movement between the two elements.

In one embodiment of the invention the two elements are a housing and a shaft mounted for rotation therein and the fluid film is air.

The supports, i.e., load-reacting members, may be resilient mechanisms, for example, springs or their pneumatic or hydraulic equivalents, or may be rigid lever mechanisms.

According to a feature of the invention there is provided a fluid bearing for use with a rotatable shaft comprising a housing, a plurality of shells (as hereinbefore defined) mounted within the housing each shell having a surface which is adapted to confront a surface of the shaft in operation to define a gap therewith which tapers towards the trailing edge of the shell, and in which a fluid film is formed to support the shaft for rotation, and a plurality of levers disposed between the housing and the shells for transmitting the operating fluid pressure loads on the shells to the housing, each lever bearing on the housing at one location, and on the respective shell at two locations spaced apart in the direction of rotation of the shaft and on opposite sides of said one location. The levers may be rigid or resilient but resilient levers are preferred so that the resilience required to cater for shaft excursions can be achieved mainly by the levers and can be separated from the resilience required in the shells for bending them to conform to the shape of the shaft.

One form of lever member may be a spring lever which has inwardly facing projection adjacent its ends to bear on a shell and an outwardly facing projection which contacts the outer housing at a position between the ends of the lever.

In a preferred form of the invention both ends of each shell are cut away to provide steps, the heights of which are different so that when the shells are assembled in overlapping relationship with the shaft in the housing, there is a step between the trailing edge of one shell and the leading edge of the adjacent shell.

Throughout the specification the expressions "leading edge" and "trailing edge" define ends of the shells with respect to the direction of the relative movement between the surfaces.

Figure 6:
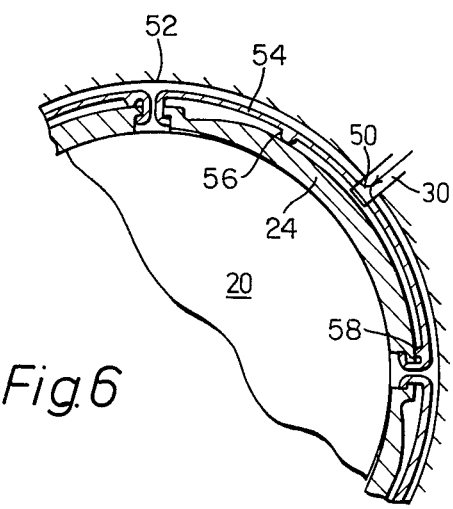
Figure 3:
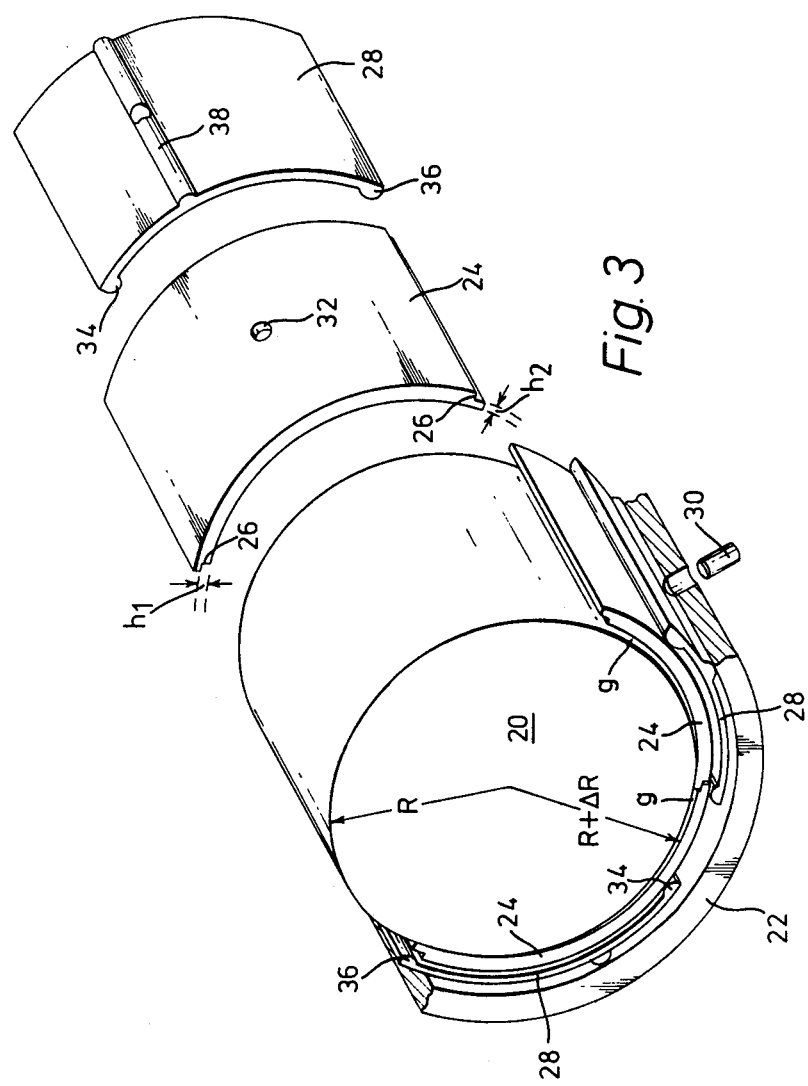
Figure 4:
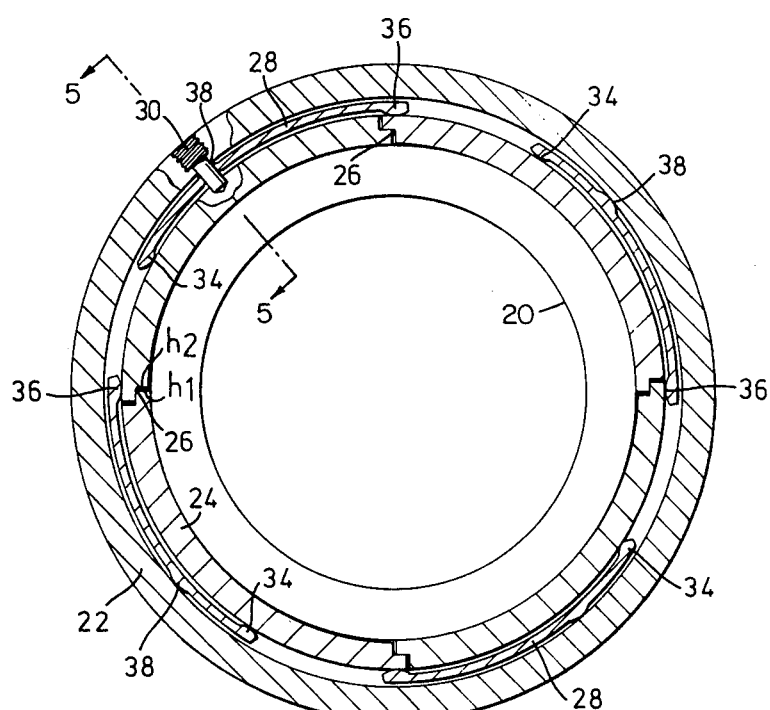
Figure 5:
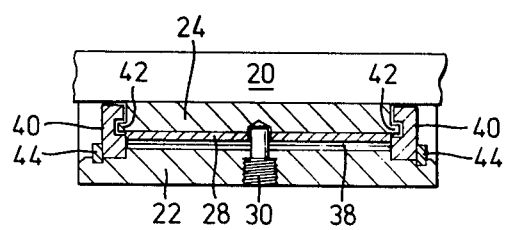

Examples of the present invention will now be more particularly described with reference to the accompanying drawings, in which:

FIG. 1 is a diagrammatic representation in section of a bearing embodying the principles of the present invention, FIGS. 2a, 2b and 2c are graphs showing respectively the gap profiles in the unloaded and loaded conditions of a typical bearing of the invention, and the air pressure in the gap in operation, FIG. 3 is an exploded pictorial view of a shell bearing according to the invention, FIG. 4 is a cross-section through the bearing of FIG. 3 in its assembled condition, FIG. 5 is a view along the line of 5—5 of FIG. 4 of the bearing housing and part of the shaft, FIG. 6 is a cross-section through an alternative bearing construction showing the shell bearing equivalent to a tilting pad bearing.

Referring now to the drawings, there is shown in FIG. 1 a diagrammatic view of a shaft bearing in which a shaft 10 is supported for rotation in a housing 12 by means of a fluid film formed in operation between the surface of the shaft and the surfaces of four shells 14. The leading edge of each shell is supported on the trailing edge of the preceding shell to define a step so that a gap 16 is produced between the surfaces of the shaft and the shells, which tapers towards the trailing edge of each shell.

In operation, with the shaft 10 rotating in the direction of the arrow R, air is drawn into the tapering gaps and as the speed of rotation increases, the pressure in the air film increases until it lifts the shell clear of the shaft and the shaft runs wholly supported on the air film.

To optimize the load carrying capacity of the bearing, load reacting members in the form of spring levers 18 are provided, which operate between the shells and the housing to transmit the air pressure loads on the shells to the housing and, in so doing, to provide reaction loads back onto the shells to modify the shapes of the shells from their unloaded shape.

The positions of the load reaction points are calculated to provide a shape of the shell which conforms more closely to the shape of the shaft to maintain an optimum gap profile beneath the shell for designated operating speed and loading of the shaft.

Considering the loads on one shell, the air pressure in the gap provides a distributed load on the underside of the shell which varies with the thickness of the gap, the maximum pressure being generated where the gap thickness is minimum. For the purpose of analysis this load can be regarded as a single resultant load A on the shell acting near the pressure peak.

This load A is transmitted to the housing through the spring levers 18 which bear on the shells at reaction points B and C and on the housing at D. The effect of the reactions on the shells at B and C is to bend the shells in the manner of a beam so that its curvature more closely conforms to that of the shaft than it did in its unstressed state. A further reaction which completes the shell equilibrium occurs at E where the two shells overlap and the preceding shell produces an outward reaction.

The effect of the combined gas pressure loads and the various reactions on the shell can be made, by suitable positioning of the points B and D, to produce an optimum gap profile under the shells for a designed operating speed and load on the shaft. This in turn gives a greater load carrying capacity for a given maximum pressure.

Since the shells act as resilient beams and the values of the air pressures generated for any given gap thickness can be calculated, the dimensions of the springs and the positions and values of the reactions can be calculated to optimise the load carrying capacity of the bearing by appropriate bending of the shells.

Clearly many variations can be provided in the construction of the shell bearing for optimization of its performance. For example, the minimum gap thickness can be arranged to be at the trailing edge of each when the shell bearing is inoperative so that it remains close to the trailing edge during operation. Further, the shells need not overlap at the ends, and apart from the reaction point at B which must be between the ends of the shells other reaction points may be spaced from, or at the ends of the shell.

FIGS. 2a, 2b and 2c show curves for the specific bearing design to be described with reference to FIGS. 3 to 5. FIG. 2a shows the gap profile under a shell at zero load and no rotation of the shaft. It can be seen that the gap reduces to nothing at the trailing end of the shell. FIG. 2b shows the gap profile at a load of 114 lb. and it can be seen that due to the reaction loads at B, C and E bending the shell, the gap thickness is maintained substantially uniform for a substantial length of the shell forward of the trailing edge. FIG. 2c shows the flattened pressure profile in the air film under the shell which enables significantly increased loads to be carried by the shell bearing of the present invention compared to a foil bearing.

The bearing construction from which the above-described curves was derived is shown in FIGS. 3 to 5. In these figures there is shown a shaft 20 mounted for rotation in a housing 22 and supported for such rotation in four shells 24, only three shown in FIG. 3, each of which extends 90° around the circumference of the shaft.

Each shell is of fixed radius of curvature which is a small amount, $\Delta R$, greater than the radius R of the shaft, and at each end, each shell is cut away to form a step 26 so that, on assembly adjacent ends of the shell overlap. The step heights $h_1$ and $h_2$ of the radially inner portions of the steps are different at the opposite ends of each shell. Thus in the assembled bearing, the leading edge of each shell is supported clear of the shaft to provide a fixed gap g at that end between the radially inner surface of the shell and the radially outer surface of the shaft. Since the trailing edge of each shell, which is free or unsupported, is in contact with the shaft, or during operation of the bearing has a very small clearance from the shaft, there is defined a tapering gap between the shell and the shaft. The tapering gap is arranged to be convergent in the direction of rotation of the shaft that is, towards the trailing edge of the shell, so that rotation of the shaft, causes air to be compressed under the shells, so providing a lifting force to support the shaft on a film of air during its rotation.

In this particular example the radius of the shaft R is 1.851 ins. and $\Delta R$ is 0.004 ins. Thus the step height g at the leading edge with no load on the shaft, (other than an initial pre-load) and no rotation of the shaft, is 0.004 ins.

The shells themselves are in turn supported within the housing 22 by curved spring levers 28. Each of the spring levers are located relative to a shell, and the whole assembly of shells and spring levers within the housing is prevented from rotation by four pins 30, which extend through the housing and the spring levers and located in holes 32 in the shells. Each spring lever 28 has radially inwardly extending ribs 34,36 one adjacent each end, which extend axially along the lever. The ribs contact the outer surfaces of the shells, and the levers are so disposed that one of the ribs contacts a shell adjacent the overlapping ends, and the other rib contacts the adjacent shell at a position intermediate between the ends of the shell. Each spring lever also has a similar rib 38 on its radially outer surface which is adapted to contact the outer housing. Thus the spring levers can apply the necessary pre-load to the shells in order to locate the shaft in its rest position.

In operation the air pressure is built up under each of the shells as described above, and forms a pressure distribution which peaks a short distance from the trailing edge the of each shell where the gap is of minimum thickness.

As soon as sufficient pressure has built up to overcome the preload on the shells the shells lift away from the shaft at the trailing edges to produce a thin film of air under the shells on which the rotating shaft is supported as described above.

When a radial load is applied to the shaft during operation of the bearing the spring levers operate as follows:

Any radial movement of the shaft initially tends to reduce the small gap thickness between the shells and the shaft which directly increases the pressure in the air film under the shells. The movement of the shaft is therefore transmitted to the shell by the air pressure and the shells tend to move radially outwardly. Because of the overlapping arrangement of the shells, movement of the trailing edge or one shell causes a corresponding movement in the leading edge of the adjacent shell which is supported thereon and the step height g of the shells cannot change. The shells will therefore tend to move bodily in the direction of the shaft movement increasing the spring load on one side of the bearing and decreasing the spring load on the other side.

Since the shells are reacted upon by the rids 34 on each spring lever bearing directly on the shell, and by rib 36 bearing on the shell through the intermediary of the adjacent shell, movement of the shells causes movement of the reaction points of the spring levers, i.e., the ribs 34 and 36. This in turn causes bending of the lever arms between the ribs 34,36 and the fulcrum points 38 of the levers on the housing. The bending moment thus produced in the spring produces reactions on the shell through the ribs 34,36. Since these reactions are at locations on opposite sides of the resultant air pressure load they bend the shell to cause it to conform more nearly to the shape of the shaft near the trailing edge.

By selecting the lengths of the lever arms between ribs 34,36 and rib 38, and the stiffnesses of the shells and the springs appropriately the reaction loads on the shells can be arranged to alter the curvature of the shell relative to that of the shaft, and hence the gap profile, to optimise the gap profile as shown in FIG. 2b to produce a flattened pressure distribution as shown in FIG. 2c which may have a maximum pressure less than the peak pressure which would be produced in the unmodified gap profile. This pressure over a significant length of the shell surfaces greatly increases the load carrying capacity of the bearing.

Thus it can be seen that in the present bearing the shells do not suffer from the severe local distortion or blistering suffered by very thin foils in foil bearings because their stiffness is such that they can withstand the fluid pressure loads between the support points on the springs and a more general deformation is produced in the shell.

As can be seen from FIG. 5 the assembly of the shells in the housing is completed by rings 40 which engage circumferentially extending projections 42 at the axial ends of each shell, and the rings are retained in the housing by circlips 44. The housing, shells and spring levers thus form a complete bearing element into which the shaft can be fitted.

Theory shows that more lift can be gained by using a small number of shells of greater length and although any number of shells, say between three and 12 may be selected, we have found that a convenient number is four. With four part-cylindrical shells it can be seen that if, in the unloaded condition of the bearing the difference in radius Δ R between the inner surface of the shell and the outer surface of the shaft is equal to the step height at the leading edge of the shells, the tangent points where the shells contact the shaft will be at the trailing edges of the shells in the unloaded condition.

Although the shells have been described as having constant radius of curvature, in their free state they may, of course, be pre-curved according to any suitable law, for example, a cubic law, and the step height would therefore be selected accordingly.

In the above-described example the shell thickness is 0.140 ins. and the shaft speed for which the hearing is designed is only 10,000 r.p.m. For higher speeds and higher loads the shells are of the order of 0.060 ins. per inch of shaft diameter.

In alternative embodiments the load reacting members may take different forms. For example the spring levers may be replaced by unconnected resilient load reacting members of different spring rates to produce proportional reactions at the different locations as the shells move radially to produce the appropriate bending of the shell. Alternatively, the spring levers may be replaced by rigid levers, the proportionate loads being achieved simply by the mechanical advantage of the lever arms.

A resilient spring lever system as described is preferred however, since the stiffness of the shells can then be calculated on the basis that the spring levers will provide the resilience needed for dealing with shaft excursions and vibrations, and the shell resilience will contribute little to this function. Clearly the stiffnesses of the shells and the levers must be matched but greater flexibility of design is achieved.

FIG. 6 shows an alternative embodiment of the invention in which the shells are independently mounted and do not overlap. In this respect the bearing resembles a tilting pad bearing rather than a foil bearing, but the difference is that the shells have some resilience, and the supports apply controlled bending of the shells to optimize the load carrying capacity. Components common with FIGS. 3 to 5 are given the same references.

The shells 24 are carried in spring lever locators 54 which wrap around the ends of the shells. Ribs 56 and 58 are provided on each of the spring lever locators to contact the shells directly and a further rib 50 is provided on the back of the spring lever to contact the housing 52. The rib 50 is positioned opposite the resultant of the gas pressure loads and as described before, the ribs 56 and 58 move radially as the shell moves under gas pressure loads and put bending stresses into the lever arms between themselves and the rib 50.

Rib 50 transmits the pressure loads to the housing and the reactions on the shells at ribs 56 and 58, which straddle rib 50, bend the shell into a configuration having greater load carrying capacity. In this example a further reaction is produced by the spring contacting the shell under the leading edge and this puts a clockwise moment into the shell in addition to the other reactions to assist in obtaining the optimum deformation of the shell.

Further advantages of the invention are that with an appropriate thickness of shell, which as described above may be 0.150 ins. in a 3 in diameter bearing, a metal oxide may be sprayed on to the shells for reducing friction between the shells and the shaft. Suitable oxides for operation at elevated temperatures for example 500° C. are chromium oxide, cobalt oxide or a combination of nickel and chromium oxides, and the oxide layer may be between 0.002" and 0.006" thick. An oxide coating may also be applied to the shaft surface if desired.

For cooler applications of the bearing other suitable known anti-friction coatings could be used.

We claim:

1. In a fluid bearing assembly including a pair of elements mounted for movement relative to each other on a fluid film formed between bearing surfaces formed on a plurality of resilient shells supported at points along their length between said elements and a bearing surface formed on one of said elements, the improvement comprising:

each of said resilient shells being of a thickness which, relative to its other dimensions is such as to prevent said shell from locally deflecting at unsupported positions thereof in response to increases in the pressure of said fluid film, and means being provided operable in response to increases in pressure in said fluid film to bend each of said shells in the manner of a stiff beam in a controlled manner to modify the shapes of the shells so that the bearing surfaces on the shells conform more closely to the bearing surface of said one element in regions of minimum fluid film thickness.

2. A fluid bearing assembly as in claim 1 wherein said relative movement of said pair of elements generates in said fluid film a pressure applied to said shells which has a resultant force point, and the means for bending said shells comprises a plurality of load reacting members respectively mounted between each of said shells and the other element, each load reacting member providing reaction loads to two locations on a shell on opposite sides thereof from said resultant force point.

3. A fluid bearing assembly as in claim 2 wherein said pair of elements comprise a shaft and a cylindrical housing within which the shaft is mounted for rotation, the shells being mounted between said shaft and housing.

4. A fluid bearing assembly as in claim 3 wherein said shells each have leading and trailing edges with respect to the direction of rotation of the shaft, and the load reacting members provide one of said reaction loads at a location adjacent the trailing edge of each shell and the other of said reaction loads at a location between the leading edge of each shell and said resultant force point of the fluid pressure loads on the shells.

5. A fluid bearing assembly as in claim 4 wherein a third reaction load location is provided on each shell.

6. A fluid bearing assembly as in claim 4 wherein said load reaction members are in the form of resilient levers disposed between each shell and the housing, said levers bearing on the shells at said two locations and contacting the housing at a location intermediate said two locations to provide said reaction loads.

7. A fluid bearing assembly as in claim 6 wherein said levers extend circumferentially of the housing, each lever having an axially extending rib which faces radially outwardly to contact the housing, and two axially extending ribs which extend radially inwardly to contact the shells to provide said reaction loads, the radially outwardly facing rib lying circumferentially between the inwardly facing ribs.

8. A fluid bearing as in claim 6 wherein said shells and said levers are prevented from rotation within said housing by pins which interlock the housing and the shells and which pass through the levers.

9. A fluid bearing as in claim 6 wherein said levers are resilient and are provided with hooks at the ends thereof which are adapted to hook around the ends of the shells.

10. A fluid bearing assembly as in claim 4 wherein the leading and trailing edges of the shells are cut away to provide steps whereby the shells are mounted in overlapping relationship at the leading and trailing edges, the step heights at the leading and trailing edges being different by a predetermined amount so that the leading edge of each shell is maintained clear of the shaft by a predetermined amount whereby each shell defines a gap with a surface of the shaft, said gap having a profile which tapers towards the trailing edge of the shell.

11. A fluid bearing as in claim 4 wherein said shells have a cylindrical shape and have a slightly greater radius of curvature than said shaft.

12. A fluid bearing as in claim 1 wherein the fluid is air.

13. In a fluid bearing for use with a rotatable shaft including a shaft, a cylindrical housing, a plurality of resilient shells supported along their length between said shaft and housing and having bearing surfaces adapted and arranged to cooperate with a bearing surface on the shaft and a fluid film provided between said shaft and shell bearing surfaces for supporting the shaft for rotation, the improvement comprising:

each of said resilient shells being of a thickness which, relative to its other dimensions is such as to prevent said shell from locally deflecting at unsupported positions thereon in response to increases in the pressure of said fluid film; and means being provided operable in response to increases in pressure in said fluid film to bend each of said shells in the manner of a stiff beam in a controlled manner to modify the shapes of the shells so that the bearing surfaces on the shells conform more closely to the bearing surface of said shaft in regions of minimum fluid film thickness.

14. A fluid bearing assembly for use with a shaft rotatable in a cylindrical housing comprising a plurality of resilient curved shells each having a leading and trailing edge, said curved shells being supported at points along their lengths between said shaft and housing and disposed such that a leading edge of one shell is adjacent the trailing edge of another shell with said plurality of shells substantially forming an annular ring surrounding the curved outer periphery of said shaft, the radius of curvature of said curved shells being larger than the radius of curvature of said shaft such that a gap having a decreasing thickness is provided between at least a portion of each of said inner surfaces of said curved shells and said shaft;

a fluid film disposed between the inner surface of said shells and the outer surface of said shaft and filling said gaps, said fluid film having a pressure which varies in accordance with the relative movement between said shaft and housing, said curved shells being of sufficient stiffness such that said fluid film pressure does not produce local deflections in said shells at unsupported positions thereof; and, means disposed between the outer surface of said shells and said housing for controllably increasing the curvature of said shells in response to increased fluid film pressure in a region of minimum gap thickness between said shells and said shaft so that shell curvature at said minimum gap thickness moves towards conformity with the curvature of said shaft.

15. In a fluid bearing assembly including one bearing element on which is mounted a plurality of resilient shells supported at points along their length and having respective bearing surfaces for engaging through a fluid film with a bearing surface formed on another bearing element, the improvement comprising:

each of said resilient shells being of a thickness which, relative to its other dimensions is such as to prevent said shell from locally deflecting at unsupported positions thereof in response to increases in the pressure of said fluid film, and means being provided between said shells and one bearing element and operable in response to increases in pressure in said fluid film to bend each of said shells in the manner of a stiff beam in a controlled manner to modify the shapes of the shells so that the bearing surfaces on the shells may conform more closely to the bearing surface of said another bearing element in regions of minimum fluid thickness.

* * * * *